Nov. 23, 1926. 1,607,845
J. E. PARKER
METHOD OR PROCESS OF RECOVERING FLOAT GOLD AND THE LIKE IN SUSPENSION
Filed Dec. 18, 1922
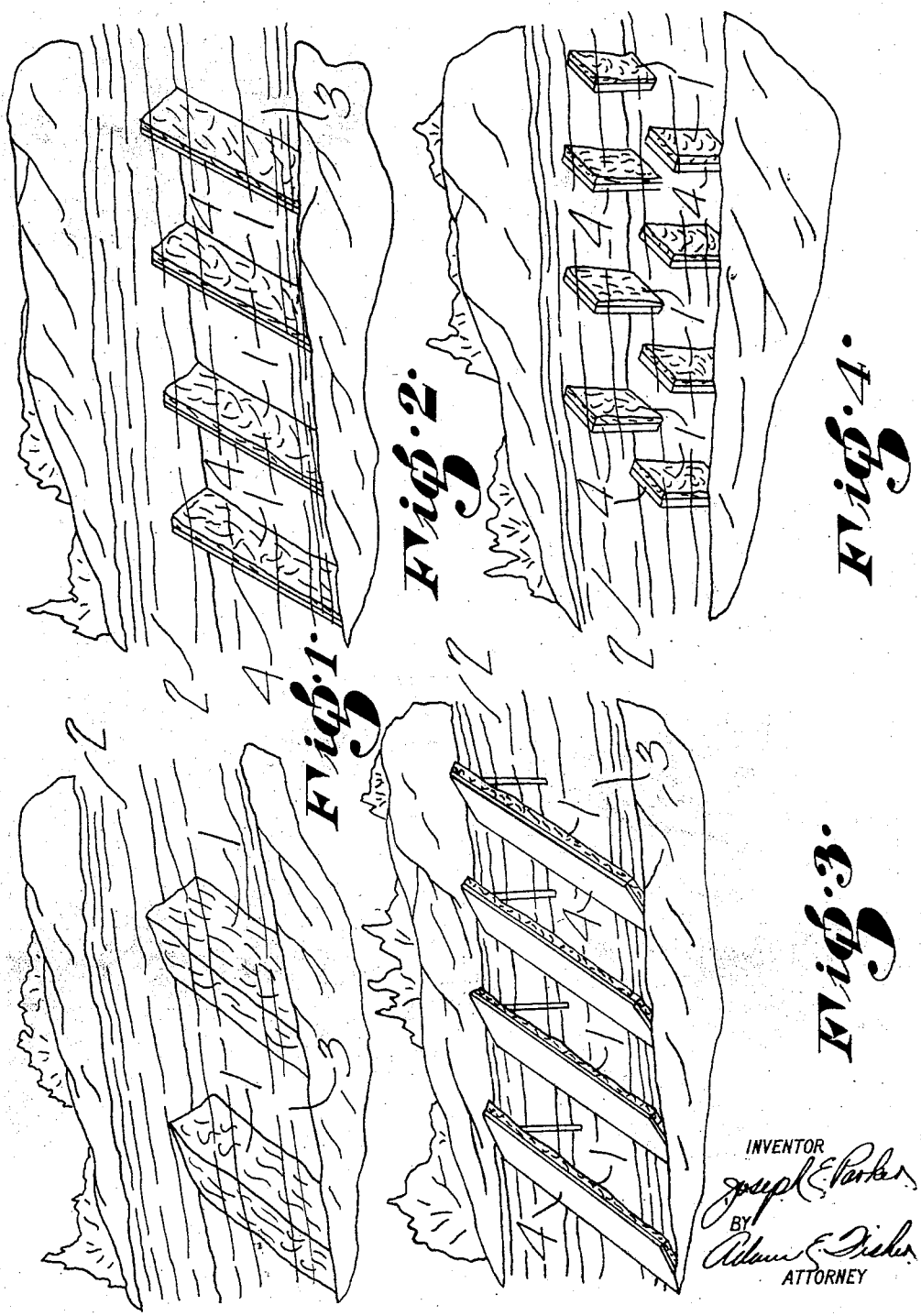

Patented Nov. 23, 1926.

1,607,845

UNITED STATES PATENT OFFICE.

JOSEPH E. PARKER, OF WOODFORD, OKLAHOMA.

METHOD OR PROCESS OF RECOVERING FLOAT GOLD AND THE LIKE IN SUSPENSION.

Application filed December 18, 1922. Serial No. 607,719.

This invention relates to a process of extracting or recovering float gold, or other comminuted mineral values or elements, or any combination thereof, from its liquid vehicle; and the process more particularly concerns a method for recovering such float gold and the like, whether in the form of dust, flour, flakes, shot, crystals or nuggets, from running streams of water, which streams, as is well known, commonly carry considerable quantities of such values in suspension.

Accordingly, the primary object of the invention is to provide a relatively simple and economical method for recovering the float gold and other values referred to from the water in which these comminuted values are naturally held in suspension as stated.

The invention consists simply in interposing, supporting and anchoring a viscous substance in the current or flow of the stream bearing the float gold or values in question, so that as the particles of such gold or other values are borne along on the current to this substance, the said particles will attach to or coalesce with the viscous substance, and thereafter, when a sufficient amount of the gold or other values has attached to the viscous substance the latter is removed en masse from the water, and the gold or other mineral values is then separated and recovered by removing the viscous substance in any conventional manner from such gold or other values.

A preferred substance for use under this method is asphalt, bitumen, mineral pitch or like hydro-carbonaceous substances in viscous form. Such substances are preferred for three reasons: First, they appear to possess a certain affinity or attraction or readiness for coalescing with gold particles and the like, so that such particles more readily attach to such substance, while detritus and other foreign materials are not so readily taken up; second, they are insoluble in water, so that they may be located in operative position in the water for indefinite periods of time; and third, they are combustible and fusible, so that they may be burned or melted away from the accumulated mineral values taken up by them, thus leaving those values in a concentrated and comparatively pure mass.

Certain preferred ways of interposing and anchoring such viscous substances in the stream are shown in the accompanying drawing.

Figure 1 is a perspective view showing the viscous substance, such as asphalt indicated at 1, sunk in the stream 2 and resting through gravity upon the stream bed 3. Where gravity is relied upon to anchor the viscous substance in the bed of the stream, a grade of the substance heavier than water must of course be selected.

Figure 2 is a perspective view showing the viscous substance 1 plastered upon planks 4 and the latter arranged in the form of riffles along and across the bed of the stream, the water flowing over them.

Figure 3 is a perspective view showing the viscous substance 1 similarly plastered over planks 4 as in Figure 2, but with the planks here arranged along and across the surface of the stream and partly immersed therein, the water flowing under them.

Figure 4 is a perspective view showing the viscous substance 1 plastered on planks 4, and the latter spaced apart and driven vertically into the bed of the stream, with the water flowing between them.

In whatever manner the viscous substance may be interposed in the stream, a large percentage of the gold particles or other comminuted mineral values will, either through gravity or by reason of being deflected by the currents and cross currents of the stream, be drawn or thrown into contact with the viscous substance and will adhere to and coalesce therewith, forming a conglomerate mass. After a suitable length of time the viscous substance becomes impregnated with the gold particles or like mineral values, and the mass is then removed from the stream. The viscous substance is then removed or eliminated by burning or melting or in any other conventional way, leaving the gold or other mineral values alone.

I claim:

1. The process of recovering float-gold and other comminuted mineral values from a stream of natural flowing water which consists in arranging a viscous hydro-carbonaceous mass in the stream on immobile rigid supports of combustible material, maintaining the same in contact with the flowing water for a sufficient period of time to allow a substantial quantity of the said desirable comminuted values to contact and coalesce with the said mass, then removing the conglomerate mass from the stream and finally burning the support and eliminating the viscous material leaving the desired mineral values intact.

2. The process of recovering float-gold and other comminuted mineral values from a stream of natural flowing water which consists in arranging a viscous hydro-carbonaceous mass in the stream on immobile rigid supports of combustible material, maintaining the same in contact with the flowing water for a sufficient period of time to allow a substantial quantity of the said desirable comminuted values to contact and coalesce with the said mass, then removing the conglomerate mass from the stream and finally burning the support and eliminating by heat a viscous material leaving the desired mineral values intact.

3. The process of recovering float-gold and other comminuted mineral values from a stream of natural flowing water which consists in arranging a viscous hydro-carbonaceous mass in the stream on immobile rigid supports of combustible material, maintaining the same in contact with the flowing water for a sufficient period of time to allow a substantial quantity of the said desirable comminuted values to contact and coalesce with the said mass, then removing the conglomerate mass from the stream and finally burning away the viscous hydro-carbonaceous substances and the support from the conglomerate mass leaving the mineral values intact.

4. The process of recovering float-gold and other comminuted mineral values from a natural stream of flowing water which consists in arranging a viscous hydro-carbonaceous mass on immobile rigid supports of combustible material, placing the support with the conglomerate mass in the stream of flowing water and maintaining the same in the stream a sufficient period of time to allow a substantial quantity of the desirable comminuted mineral values to contact and coalesce with the mass, then removing the combustible support with the conglomerate mass from the stream and finally burning away the hydro-carbonaceous substances and the combustible support leaving the mineral values intact.

5. The process of recovering float-gold and other comminuted mineral values from a natural stream of flowing water which consists in arranging viscous hydro-carbonaceous substances on wooden planks to form a viscous mass on each of the same, placing the wooden planks with the viscous hydro-carbonaceous substances in a natural stream of flowing water, maintaining the same in the stream a sufficient period of time to permit a substantial quantity of the comminuted mineral values to contact and coalesce with the said substances, then removing the planks with the viscous substances from the stream and finally burning the planks and eliminating the viscous hydro-carbonaceous substances by burning away the same leaving the mineral values intact.

6. The process of recovering float-gold and other comminuted mineral values from a natural stream of flowing water which consists in arranging a viscous asphaltic mass in a natural stream of flowing water on immobile rigid supports of combustible material, maintaining the said mass in the flowing water for a sufficient period of time to collect a substantial quantity of mineral values, then removing the asphaltic mass with the collected mineral values from the stream and finally burning the support and separating by heat the asphaltic mass from the mineral values.

7. The process of recovering float-gold and other comminuted mineral values from a natural stream of flowing water which consists in arranging a viscous asphaltic mass in a natural stream of flowing water on immobile rigid supports of combustible material, maintaining the said mass in the flowing water for a sufficient period of time to collect a substantial quantity of mineral values, then removing the asphaltic mass with the collected mineral values from the stream and finally burning away the asphaltic mass and the combustible support leaving the mineral values intact.

8. The process of recovering float-gold and other comminuted mineral values from a natural stream of flowing water which consists in arranging a viscous asphaltic mass on a plurality of wooden planks placing the wooden planks in a natural stream of flowing water maintaining the asphaltic mass on each of the planks facing the flowing water for a sufficient period of time to allow a substantial quantity of mineral values to contact and coalesce with the asphaltic material then removing the planks with the asphaltic material and values from the stream and finally burning away the asphaltic material and the wooden planks leaving the mineral values intact.

JOSEPH E. PARKER.